United States Patent [19]

Maeda

[11] Patent Number: 5,406,533
[45] Date of Patent: Apr. 11, 1995

[54] INFORMATION SIGNAL RECORDING APPARATUS

[75] Inventor: Takanori Maeda, Tokorozawa, Japan

[73] Assignee: Pioneer Electronic Corporation, Tokyo, Japan

[21] Appl. No.: 96,003

[22] Filed: Jul. 23, 1993

[30] Foreign Application Priority Data

Aug. 26, 1992 [JP] Japan ................... 4-227149

[51] Int. Cl.⁶ ............................................ G11B 17/22
[52] U.S. Cl. ..................................... 369/32; 369/47; 369/54
[58] Field of Search ............... 369/32, 47, 48, 49, 369/44.32, 53, 54

[56] References Cited

U.S. PATENT DOCUMENTS

| 5,224,087 | 6/1993 | Maeda et al. | 369/54 |
| 5,257,248 | 10/1993 | Ogasawara | 369/32 |
| 5,341,359 | 8/1994 | Birukawa et al. | 369/54 |

FOREIGN PATENT DOCUMENTS 013818  1/1989  Japan .
520720  1/1993  Japan ................... 369/13

Primary Examiner—Georgia Y. Epps
Assistant Examiner—Tan Dinh
Attorney, Agent, or Firm—Sughrue, Mion, Zinn, Macpeak & Seas

[57] ABSTRACT

An information signal recording apparatus has an information signal supply source for supplying an information signal at a predetermined transfer rate and a memory device for storing the information signal. An information signal stored in the memory device, which stores information signals at a predetermined transfer rate, is read out and recorded on a disk at a rate higher than the predetermined transfer rate, and, every time a predetermined length of an information signal is recorded, the predetermined length of the information signal, recorded immediately before reading, is read out at a rate higher than the predetermined transfer rate to thereby verify the recorded information signal. This allows read-verification of written information without losing the real time performance, and ensures successive recording of information even when an error is found in the information.

9 Claims, 4 Drawing Sheets

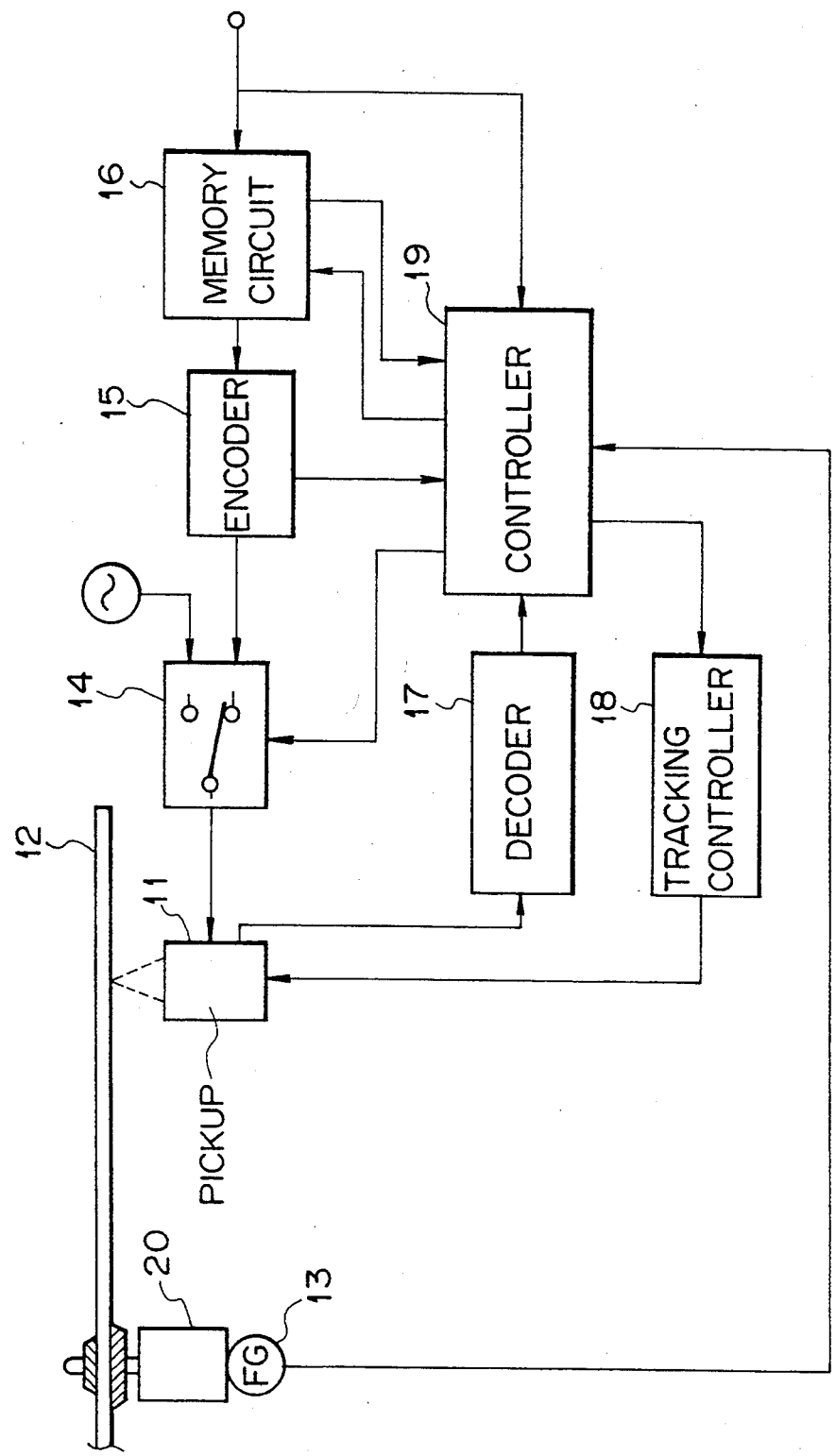

INFORMATION SIGNAL RECORDING APPARATUS

BACKGROUND OF THE INVENTION

1. Field of the Invention

The present invention relates to a signal recording apparatus for recording signals, such as video information, on tracks on a recording medium like an optical disk, and, more particularly, to an information signal recording apparatus for recording signals such as a video signal or audio signal whose reproduction speed is determined previously, on a writable recording medium which utilizes a change in pigment or a change in magnetism.

2. Description of Background Information

A WORM type (or direct read after write type) disk, which utilizes pigment, and a magnetooptic disk, which uses the magnetooptic effect, are known as writable recording media. In recording, for example, an audio signal on such a disk, the supplied analog audio signal is converted to binary values, redundancy for error correction is added to the binary signal, then the resultant signal is recorded in real time on the disk at a speed corresponding to the supplied audio signal.

The recording system would differ depending on the type of a recording medium of a disk in use. For example, when an organic pigment is used as a medium, for a signal of "1", intense light is irradiated on the disk to change the reflectance and the shape of the pigment. When the signal is "0", the disk will not be exposed to the light that causes such a change. Accordingly, the signal converted to binary values can be recorded on the disk. Any information once written on this type of medium cannot be erased.

With a magnetooptic type disk in use, intense light is given to the disk to increase its temperature to or above the Curie point, and, at the time of reproduction, the polarization status of reflected light is checked to find the signal level, thus ensuring recording and reproduction of binary signals. This method allows written information to be rewritten.

To check if information has been written correctly in such a real-time recording system, it is necessary to provide a separate pickup device for data reading and to trace recorded tracks with this pickup to verify the recorded signals.

If a write error is detected through the verification, it is necessary to record the position of the occurrence of the error on a specific portion on the disk, temporarily stop supplying the input signal and retry the recording for the erred signal (error correction). Reproduction of the recorded information data at the error-occurred portion should be made invalid and the subsequent data should be used instead. This requires that all the data be temporarily read into a computer or the like for reproduction, losing the real time performance, and that the reproducing apparatus should be equipped with a storage device of a large-capacity.

When pre-erasing of data from an erasable disk, such as a magnetooptic disk is needed, there also arises a problem that the real time performance will be lost.

One solution to the above shortcoming of magnetooptic disks was proposed in Japanese Patent Kokoku No. H3-13653.

According to the proposed method, the relative speed of a magnetooptic disk and the pickup at the recording time is set twice that of the reproduction to compress information along the time axis, so that erasure would be executed previously in real time.

Even with the use of this method, however, if a scratch, a defective portion or the like exists on the recording medium and writing has not been done properly, the aforementioned verification process should be performed at the expense of the real time performance in order to make the correction.

With the use of a WORM type optical disk that uses an organic pigment, in particular, if the disk contains a defective portion, it is not possible to continuously reproduce a spiral track to correctly read the recorded information. Even a slight defect on a disk would prevent the use of the whole disk. It is therefore necessary to carefully check stain or scratch on a WORM type optical disk, thus decreasing significantly the operability.

SUMMARY OF THE INVENTION

It is therefore an object of the present invention to provide an information signal recording apparatus which overcomes the above-described shortcomings of the prior art, and which can perform read verification of written information without losing the real time performance, and can successively record information even when an error is found in the information.

To achieve the foregoing and other objects and in accordance with the purpose of the present invention, the information signal recording apparatus according to the present invention has information signal supply means for supplying an information signal at a predetermined transfer rate and memory means for storing the information signal, which apparatus comprises disk recording means for reading the information signal stored in the memory means and recording the read information on a disk at a rate higher than the predetermined transfer rate; and recorded information verifying means for, every time the disk recording means records a predetermined length of an information signal, reading the predetermined length of the information signal, recorded immediately previously, at a rate higher than the predetermined transfer rate to thereby verify the recorded information signal.

The information signal recording apparatus of the present invention reads an information signal stored in the memory means, which stores information signals at a predetermined transfer rate, and records the read information on a disk at a rate higher than the predetermined transfer rate, and, every time the apparatus records a predetermined length of an information signal, it reads the immediately previously recorded predetermined length of the information signal at a rate higher than the predetermined transfer rate to thereby verify the recorded information signal.

BRIEF DESCRIPTION OF THE DRAWINGS

FIG. 4 is a block diagram of an information signal recording apparatus according to another embodiment of the present invention.

DETAILED DESCRIPTION OF THE PREFERRED EMBODIMENTS

Preferred embodiments of the present invention will now be described referring to the accompanying drawings.

Figure 1:
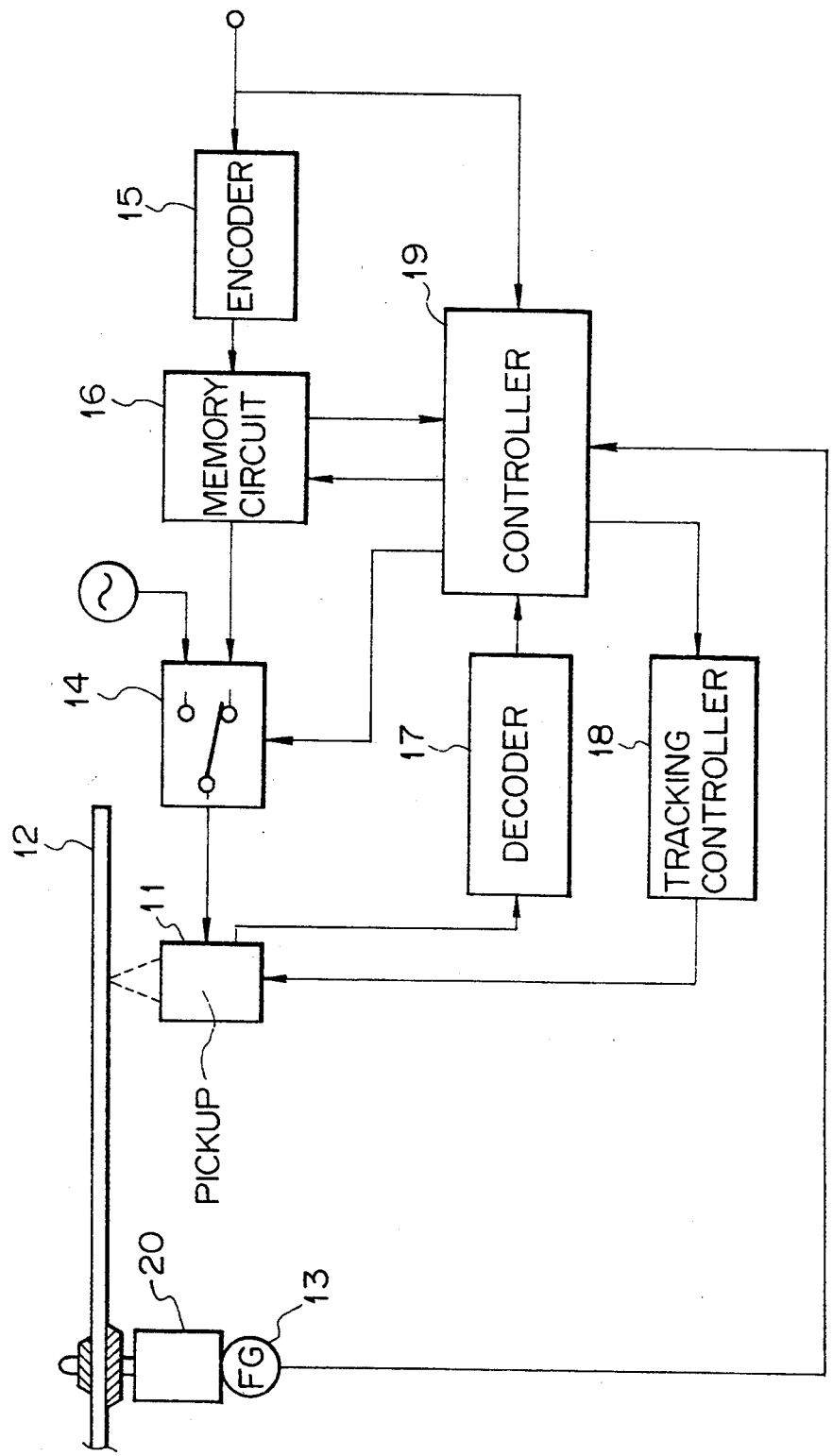
FIG. 1 is a block diagram of an information signal recording apparatus according to one embodiment of the present invention.

FIG. 1 is a block diagram of an information signal recording apparatus according to one embodiment of the present invention.

In the diagram, a pickup 11 emits light to write an information signal on a WORM type optical disk 12 or read a recorded information signal in accordance with the output signal of a selector 14. This disk 12 is rotated by a spindle motor 20. The selector 14 selects the output signal of a read enable signal source or the output signal of a memory circuit 16 in accordance with a control signal output from a controller 19, and sends the selected signal to the pickup 11. An encoder 15 converts a received information signal (real-time signal) into a signal that is to be recorded on the disk. The memory circuit 16 sequentially stores the encoded information signal from the encoder 15, and its read/write operation is controlled by the controller 19. The information signal read from the memory circuit 16 is supplied to the selector 14. The recorded information signal read from the disk by the pickup 11 is supplied to a decoder 17 to be decoded, and the decoded information is then sent to the controller 19. A tracking controller 18 sends a track jump signal to the pickup 11 in response to an instruction from the controller 19. A position detector 13 sends a signal indicating the rotational position of the disk to the controller 19. The controller 19, which comprises a CPU, controls the operation of the individual sections.

Figure 2:
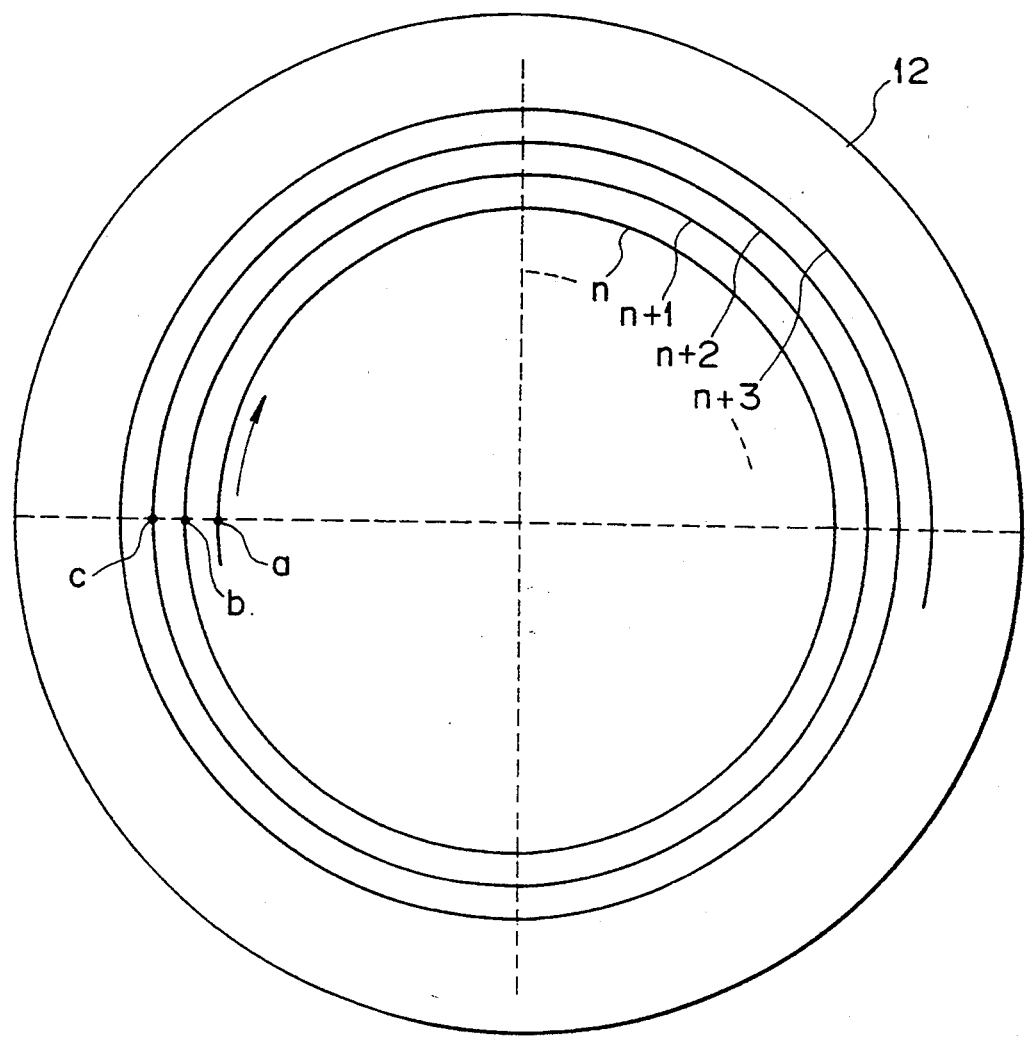
FIG. 2 is a diagram showing the recording format of an optical disk which is used in the apparatus of this embodiment.

FIG. 2 illustrates one example of the recording format of the optical disk 12, exemplarily showing the information recording track.

In the diagram, n, n+1, n+2, n+3, ... indicate track numbers or which tracks on the disk. For instance, the track n has a memory area from a point a to a point b, while the track n+1 has a memory area from the point b to a point c. All the tracks are linked to form a spiral track.

The operation of the information signal recording apparatus will now be described.

The encoder 15 is externally supplied with information signals to be recorded successively. In this example, the information signals are 1 Mbps (Mega bits per second) of digital audio signals where bps expresses the number of bits to be transferred per second. The received signals are temporarily stored in the memory circuit 16.

The disk 12 is normally rotating at a speed faster than the rotational speed for recording 1 Mbps of signals. In this example, the disk 12 is rotating at the speed that permits recording of 4 Mbps. The controller 19 controls the read operation of the memory circuit 16 to meet this bit rate. The pickup 11 reads the recorded information from the disk at a rate of 4 Mbps and sends the read signal to the decoder 17. Then, the decoder 17 sequentially sends out the decoded output to the controller 19.

Figure 3:
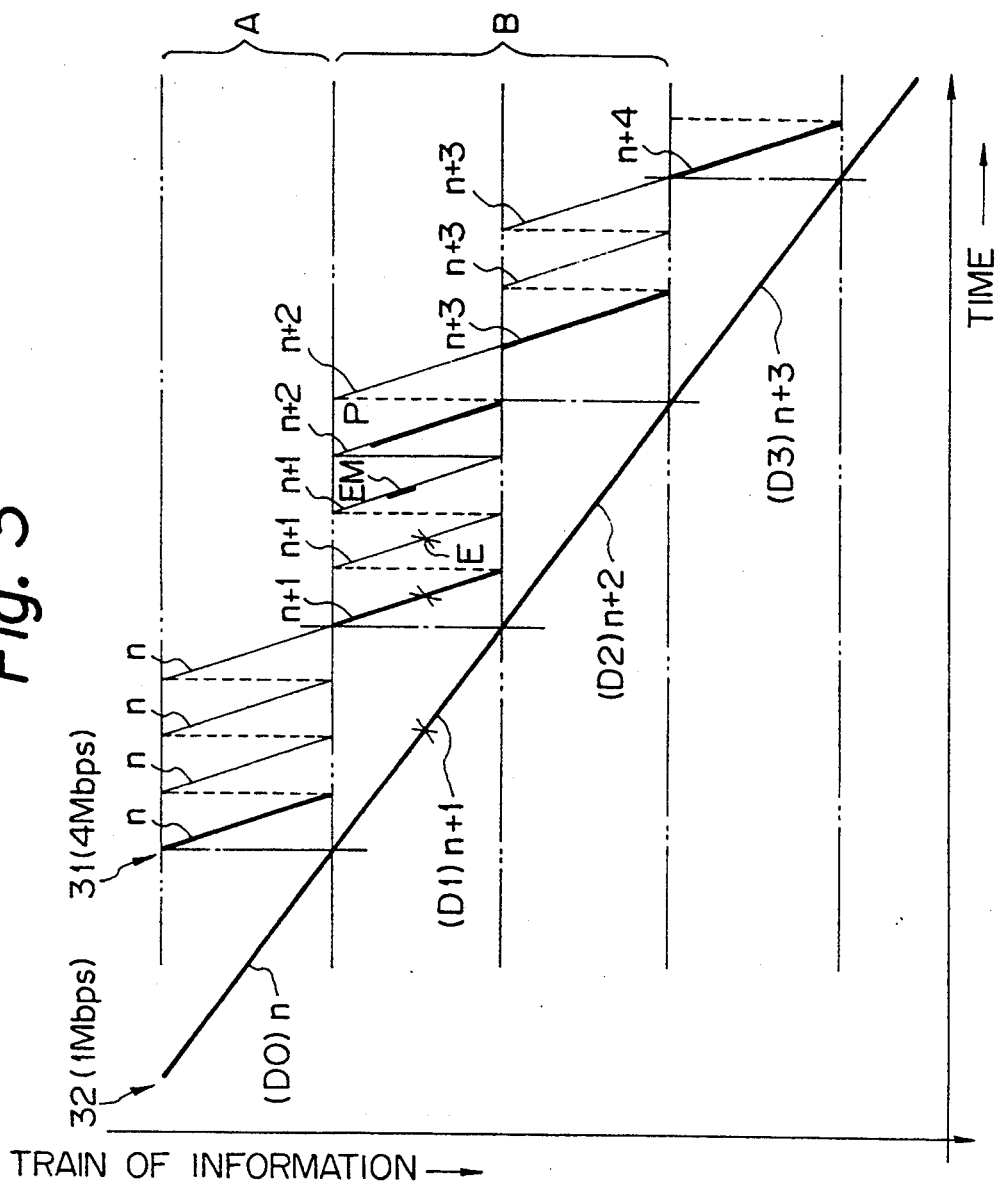
FIG. 3 is a diagram illustrating the operation of this apparatus.

FIG. 3 illustrates the operation of the controller 19.

The horizontal axis in FIG. 3 represents the passage of time, and the vertical axis a train of information pieces supplied.

A line 32 in the diagram represents the operation of the conventional apparatus, and indicates that a train of information pieces is recorded at a constant speed with respect to time. In other words, recording on the disk 12 is carried out almost at the same time the information signal is supplied. In the diagram, n, n+1, ... given to the segments of the line 32 indicate the numbers of tracks the pickup is tracing as shown in FIG. 2. Information signal data D0 is recorded on the track n, information signal data D1 is recorded on the track n+1, information signal data D2 is recorded on the track n+2, information signal data D3 is recorded on the track n+3, and so forth in order. The inclination of this line 32 corresponds to a data rate of 1 Mbps. The mark "x" on the line 32 represents the occurrence of a defect. In this example, since a defect has occurred on the track n+1, a train of pieces of data D1 has not properly been recorded.

A polygonal line (including broken lines) 31 in FIG. 3 indicates the operation of the apparatus of this embodiment.

As information signal data, a train of information pieces, is stored piece by piece in the memory circuit 16, it is possible to shift the operation forward of the real-time line of the prior art. Of the polygonal line 31, the thick line portion indicates writing operation to the disk 12 (thus, the reading operation of the memory circuit 16), and the thin line portion indicates reading from the disk 12. The broken lines indicate track jumps made by the tracking controller 18.

As the bit rate of the polygonal line 31 is 4 Mbps, the solid line portion (thick and thin line portions) of the polygonal line 31 has a sharp inclination about four times the inclination of the line 32.

The region A in the diagram shows the operation when no error has occurred. The pickup 11 records information signal data D0 on the track n at a rate of 4 Mbps, detects the position of the recording through the position detector 13, sends the detection signal to the controller 19, jumps over a track inward when one full turn of recording is complete, and traces the track n again. The pickup 11 then reads the recorded information signal from that track n to verify if an error is present in the information signal just recorded.

This verification may be accomplished by checking an error using the redundancy included in the recorded information, or comparing the recorded information with the original data stored in the memory.

If there is no error found through verification, two more track jumps are performed with respect to the same track n for each turn before advancing to the next track. In the last reading of the track n, the phase of the signals recorded so far and recording can start in synchronism with this phase, so that successive signal recording is possible.

In FIG. 3, the region B represents the operation when an error has occurred in data writing. The pickup 11 traces the track n+1 to record information signal data D1 thereon. After one turn, the pickup 11 performs a track jump again for information reading as done in the region A. In this diagram, "E" indicates that an error has been detected. The pickup 11 performs a track jump again to trace the track n+1. The pickup 11 writes a mark indicating the occurrence of an error in the portion preceding the occurrence of the error. In the case of a WORM type disk, for example, a record mark longer than the one used in the ordinal modulation is written over to be the error mark. "EM" in the diagram represents the writing of the error mark.

Then, the pickup 11 does not make a track jump and traces the next track n+2 (which is indicated by the solid line instead of the broken lines). While tracing the track n+2, the pickup 11 starts recording that information signal of the information signal data D1 which includes the write-failed portion on the track n+1 from the position p corresponding to a position on the track n+1 that precedes the error mark.

In FIG. 3, the pickup 11 performs one more track jump and reads recorded information to verify if an error is present before accessing the track n+3.

On the track n+3, information signal data D2 is recorded. Although no complete rewriting is possible on this track, track jumping is executed in the same manner as done in the region A but one track jump less than that of the operation A to match with the writing speed, and then the track n+4 will be accessed. Thereafter, the same operation as done in the region A will be performed.

In reading information from the optical disk which has thus been recorded, when detecting the error mark, the pickup 11 makes a track jump outward. As information that follows the previously recorded information signal is recorded in this example, the information can be reproduced successively. Particularly, if the error mark portion is made restorable by the redundancy of the recording system, it is possible to obtain information data without any data loss.

Although the unit length of error verification is just set to a full track length in the above-described embodiment, it may be set longer or shorter as long as the transfer rate of the final information data matches with a desired transfer rate.

Although the foregoing description of this embodiment has been given with reference to the structure that needs tracing of two tracks to resume recording after an error is detected, if the memory size is increased, it is possible to cope with the case where errors occur consecutively.

Further, it is also possible to cope with the occurrence of an error on the track n+2 which has not been discussed in the foregoing description of this embodiment. It is also possible to perform recording on the track n+3 following the recording of the track n+2 without reading the track n+2 unlike in the above-described embodiment.

While the foregoing description of this embodiment mentioned that the transfer rate for the supplied information signal data is 1 Mbps and the speed of writing and reading the disk is set four times that rate, those transfer rates and the ratio of both rates to each other are not limited to the particular values.

While a long pit is mentioned as an example of the error mark in the above embodiment, the error mark may be recorded slightly away from the target track, a thicker mark than the ordinary one may be recorded, or the positions of the occurrences of errors may all be memorized, so that after given recording is complete, those positions may be recorded at a predetermined position on the disk or on another recording medium. In particular, if the error mark is recorded off the outward track so that at the time of reproduction, the tracing is automatically shifted outward without performing the mark detection and track jumping, even a reproducing machine which has no error-mark detecting function can properly reproduce the recorded information.

Although the foregoing description of this embodiment has been given with reference to the case of using a WORM type optical disk, the information signal recording apparatus can take the same arrangement as long as it is a recordable disk medium. With the use of a rewritable medium, particularly, erasure can be carried out while writing is proceeding as is known conventionally. Accordingly, the operation may be modified to perform information writing again and check for an error before writing the error mark. The error mark may be modified so that it can indicate the number of the track to be accessed next, thus making it possible to efficiently cope with the case where errors occurs consecutively.

Although the foregoing description of the embodiment has discussed the case where an error originates from a disk defect, this embodiment can also be applied to the case where noise is mixed into the modulated signal from the pickup. If the proper tracking is not conducted to cause an error due to externally applied impact or a disk defect, it is also possible to cope with this case by tracing again that portion located before the occurrence of such an error and writing an error mark there. If the apparatus is designed to stop recording when some impact or the abnormality of the tracking error signal is detected, no damage will be made to the already recorded portion.

If the apparatus is designed to store a signal before the addition of the redundancy in the memory circuit 16 as shown in FIG. 4, the memory circuit 16 can be used more effectively.

Although the transfer rate for the recording and reproduction is set four times that predetermined transfer rate in the above-described embodiment, information may be recorded or read out at a rate higher than four times the predetermined transfer rate while ensuring the same operation, as long as the memory capacity is large enough not to end up with an insufficient amount of data during the operational period at the time an error occurs.

Finally, in the above-described embodiment, the supplied signal is encoded before it is stored on a disk and the read signal is decoded before being supplied to the controller. There are various ways to discriminate an error: comparison with the supplied signal, comparison with the encoded signal, error discrimination using the redundancy, comparison after the signal is demodulated to an analog video signal and detection of an abnormal value of the servo signal. It is therefore possible to check an error at various levels.

As described above, according to the present invention, an information signal stored in the memory means, which stores information signals at a predetermined transfer rate, is read out and recorded on a disk at a rate higher than the predetermined transfer rate, and, every time a predetermined length of an information signal is recorded, the predetermined length of the information signal, recorded immediately previously, is read out at a rate higher than the predetermined transfer rate to thereby verify the recorded information signal. It is therefore possible to perform read-verification of written information without losing the real time performance, and successively record information even when an error is found in the information.

What is claimed is:

1. An information signal recording apparatus having information signal supply means for supplying an information signal at a predetermined transfer rate and memory means for storing said information signal, said apparatus comprising:

disk recording means for reading said information signal stored in said memory means and recording said read information on a disk at a rate higher than said predetermined transfer rate; and recorded information verifying means for, every time said disk recording means records a predetermined length of an information signal, reading said predetermined length of said information signal, recorded immediately previously, at a rate higher than said predetermined transfer rate to thereby verify said recorded information signal and indicate the presence of any abnormalities in said recorded information signal;

wherein when the presence of an abnormality in said recorded information signal is discriminated by said recorded information verifying means, a first predetermined information signal is recorded at a portion preceding the occurrence of said abnormality of said recorded information signal.

2. An information signal recording apparatus as claimed in claim 1, wherein when the presence of an abnormality in said recorded information signal is discriminated by said recorded information verifying means, a second predetermined information signal including that portion where said abnormality of said recorded information signal has occurred is recorded again on a track different from the abnormality-containing track.

3. An information signal recording apparatus in accordance with claim 1, wherein said predetermined length of said information signal is less than the length of a track.

4. An information signal recording apparatus in accordance with claim 1, wherein said predetermined length of said information signal is at least as long as the length of a track.

5. An information signal recording apparatus in accordance with claim 1, wherein said information signal is read at a rate at least four times said transfer rate.

6. An information signal recording apparatus in accordance with claim 1, wherein said information signal is recorded at a rate at least four times said transfer rate.

7. An information signal recording apparatus in accordance with claim 1,
wherein said memory means has a further mean for storing at least one of said predetermined lengths of said information signal.

8. An information signal recording apparatus in accordance with claim 2, wherein said apparatus is operable to indicate the presence of abnormalities in consecutively accessed tracks and record a portion of said information signal on each of said consecutively accessed tracks.

9. An information signal recording apparatus in accordance with claim 2, wherein said track is adjacent to said abnormality-containing track.

* * * * *